(12) United States Patent
Clark et al.

(10) Patent No.: US 9,740,182 B2
(45) Date of Patent: Aug. 22, 2017

(54) INTEGRATED CONTROLLER SOLUTION FOR MONITORING AND CONTROLLING MANUFACTURING EQUIPMENT

(71) Applicant: APPLIED MATERIALS, INC., Santa Clara, CA (US)

(72) Inventors: Daniel O. Clark, Pleasanton, CA (US); Youssef A. Loldj, Sunnyvale, CA (US); Shaun W. Crawford, San Ramon, CA (US); Maxime Cayer, Chandler, AZ (US); Tony H. Tong, San Jose, CA (US); Eric Rieske, Livermore, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 646 days.

(21) Appl. No.: 13/895,978

(22) Filed: May 16, 2013

(65) Prior Publication Data

US 2013/0331973 A1 Dec. 12, 2013

Related U.S. Application Data

(60) Provisional application No. 61/657,407, filed on Jun. 8, 2012.

(51) Int. Cl.
*G05B 15/02* (2006.01)
*G05B 23/02* (2006.01)

(52) U.S. Cl.
CPC ......... *G05B 15/02* (2013.01); *G05B 23/0291* (2013.01); *Y02P 90/14* (2015.11)

(58) Field of Classification Search
CPC .............................. G05B 23/0291; G05B 15/02
See application file for complete search history.

(56) References Cited

U.S. PATENT DOCUMENTS

| | | | |
|---|---|---|---|
| 6,629,009 B1 * | 9/2003 | Tamaki | G05B 19/41875 700/108 |
| 7,219,255 B2 * | 5/2007 | Khalil | G05B 9/03 714/11 |
| 7,522,974 B2 | 4/2009 | Loldj et al. | |

(Continued)

FOREIGN PATENT DOCUMENTS

| | | |
|---|---|---|
| CN | 1379300 A | 11/2002 |
| JP | 2002-215221 A | 7/2002 |

OTHER PUBLICATIONS

International Search Report and Written Opinion mailed Aug. 26, 2013 for PCT Application No. PCT/US2013/041799.

(Continued)

*Primary Examiner* — Christopher E Everett
(74) *Attorney, Agent, or Firm* — Moser Taboada; Alan Taboada (57) ABSTRACT

Methods and apparatus for controlling manufacturing equipment are provided herein. In some embodiments, a manufacturing system may include an integrated controller having one or more inputs to receive input values corresponding to operating information of at least one of a process tool, a mass flow controller or at least one sub-fab auxiliary system, wherein the integrated controller is configured to receive the input values, determine that an error condition is matched based on the received input values, and control the at least one sub-fab auxiliary system to operate at a fail-safe operating mode responsive to the determined error condition.

12 Claims, 6 Drawing Sheets

(56) References Cited

U.S. PATENT DOCUMENTS

| | | | |
|---|---|---|---|
| 8,269,620 B2* | 9/2012 | Bullemer | G05B 23/0272 340/506 |
| 2003/0226588 A1* | 12/2003 | Olander | F17C 5/00 137/240 |
| 2004/0182574 A1 | 9/2004 | Adnan et al. | |
| 2005/0113942 A1 | 5/2005 | Longsdorf et al. | |
| 2005/0187649 A1* | 8/2005 | Funk | G05B 19/4184 700/121 |
| 2007/0094548 A1* | 4/2007 | Lev-Ami | G05B 19/4186 714/47.2 |
| 2008/0262655 A1* | 10/2008 | Smith | G05B 19/4185 700/247 |
| 2008/0290041 A1 | 11/2008 | Clark et al. | |
| 2009/0018688 A1 | 1/2009 | Chandler et al. | |
| 2009/0018785 A1* | 1/2009 | Huseth | G01R 31/3648 702/63 |
| 2009/0132061 A1 | 5/2009 | Stubbs et al. | |
| 2009/0222128 A1* | 9/2009 | Clark | G05B 19/418 700/159 |
| 2009/0246105 A1 | 10/2009 | Clark et al. | |
| 2010/0106992 A1* | 4/2010 | Schauer | G05B 19/41865 713/323 |
| 2011/0118893 A1* | 5/2011 | Loldj | G05B 19/042 700/295 |
| 2011/0121649 A1 | 5/2011 | Loldj et al. | |

OTHER PUBLICATIONS

Search Report received from The State Intellectual Property Office of the People's Republic of China dated Jun. 12, 2016 for China Patent Application No. 2013800301888.

Search Report received for Taiwan Invention Patent Application No. 102118082.

* cited by examiner

INTEGRATED CONTROLLER SOLUTION FOR MONITORING AND CONTROLLING MANUFACTURING EQUIPMENT

CROSS-REFERENCE TO RELATED APPLICATIONS

This application claims benefit of U.S. provisional patent application Ser. No. 61/657,407, filed Jun. 8, 2012, which is herein incorporated by reference in its entirety.

FIELD

Embodiments of the present invention generally relate to control systems used in manufacturing electronic devices.

BACKGROUND

Electronic device manufacturing facilities, or "fabs", typically employ process tools which perform manufacturing processes in the production of electronic devices. Such processes may include physical vapor deposition, chemical vapor deposition, etch, cleaning and other electronic device manufacturing processes. It should be understood that the present invention is not limited to any particular electronic device manufacturing process. A fab is typically laid out with a clean room on one floor, and a room containing auxiliary systems and devices which support the clean room on a lower floor, herein referred to as a "sub-fab." For ease of reference, the phrases 'auxiliary systems' and 'auxiliary devices' may be used interchangeably herein to describe a sub-fab system and/or device. One important function of the sub-fab is to abate toxic, flammable, or otherwise potentially harmful substances which are common byproducts of electronic device manufacturing processes. The sub-fab may contain such auxiliary devices as abatement tools, AC power distributors, primary vacuum pumps, spare vacuum pumps, water pumps, chillers, heat exchangers, process cooling water supplies and delivery systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc.

Controller systems used in electronic device manufacturing must utilize operating information, state information and other electronic signals from process tools and sub-fab auxiliary systems to determine operating parameters. However, if one or more of the fab or sub-fab systems are not operating properly, or if information monitored by the integrated controller indicates a potential problem, unsafe operating conditions may result. For example, if pumps or abatement systems are not functioning properly, flow of toxic chemicals or global warming gases out of the electronic device manufacturing facilities may be released into the atmosphere without abatement. Other unsafe operating conditions from one or more of the fab or sub-fab systems not operating properly may include, for example, fire, equipment damage, etc.

Accordingly, the inventors have provided improved methods of monitoring, reporting and controlling process tools, gas flow controllers, and sub-fab auxiliary systems to facilitate safe and proper operation of this equipment.

SUMMARY

Methods and apparatus for controlling manufacturing equipment are provided herein. In some embodiments, a manufacturing system may include an integrated controller having one or more inputs to receive input values corresponding to operating information of at least one of a process tool, a mass flow controller or at least one sub-fab auxiliary system, wherein the integrated controller is configured to receive the input values, determine that an error condition is matched based on the received input values, and control the at least one sub-fab auxiliary system to operate at a fail-safe operating mode responsive to the determined error condition.

In some embodiments, a method of controlling a manufacturing system may include monitoring, by an integrated controller, operating information of at least one of a process tool, a mass flow controller or at least one sub-fab auxiliary system of the manufacturing system, determining, by the integrated controller, that an error condition is matched based on the monitored operating information; and controlling, by the integrated controller, the at least one sub-fab auxiliary system to operate at a fail-safe operating mode responsive to the determined error condition.

Other and further embodiments and variations of the invention are described in more detail, below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention relate to controls systems for monitoring and controlling "fab" systems and "sub-fab" auxiliary systems used in the manufacture of electronic devices. Embodiments of the present invention provide an integrated control solution that utilizes process state and operating information from process tool sets, gas panels, and sub components to ensure that the fab and sub-fab systems are operating safely. For example, exemplary embodiments consistent with the present invention provide smarter and safer operation of fab and sub-fab systems by assuring that various error conditions (e.g., incorrect configuration information, loss of communication or power, the incorrect connection of signals to an integrated controller, and the like) do not result in an unsafe operating condition. If an error condition is detected, exemplary control systems consistent with the present invention may control the sub-fab equipment to operate in a fail-safe mode, show a warning lamp, display an error message, and/or defer control back to the local sub-fab controllers. In some embodiments consistent with the present application, the fail-safe modes for sub-fab components may include high capacity modes to accommodate the worst case process demands (e.g., the highest effluent load demands) of the process tool on abatement systems and pumps.

Although embodiments herein describe an integrated controller, the integrated controller may consist of multiple controllers which may be communicatively coupled. In addition, in some embodiments, there may be more than one control core per controller (i.e., one controller can communicate with multiple tools and sub-fab components.) Furthermore, although discussed in terms of "control" of fab and sub-fab components, in some embodiments consistent with the present application, "control" may consist of providing control signals to the "independent controllers" of the sub-fab components.

Finally, although embodiments herein describe controls systems for manufacturing systems used in the manufacture of electronic devices such as substrate processing systems, embodiments of the present invention may be used in other industries where conservation of resources, reducing environmental impact of waste products, and error reporting of manufacturing equipment are of concern, such as for example, but not limited to, the life science, food and agricultural industries.

Figure 1:
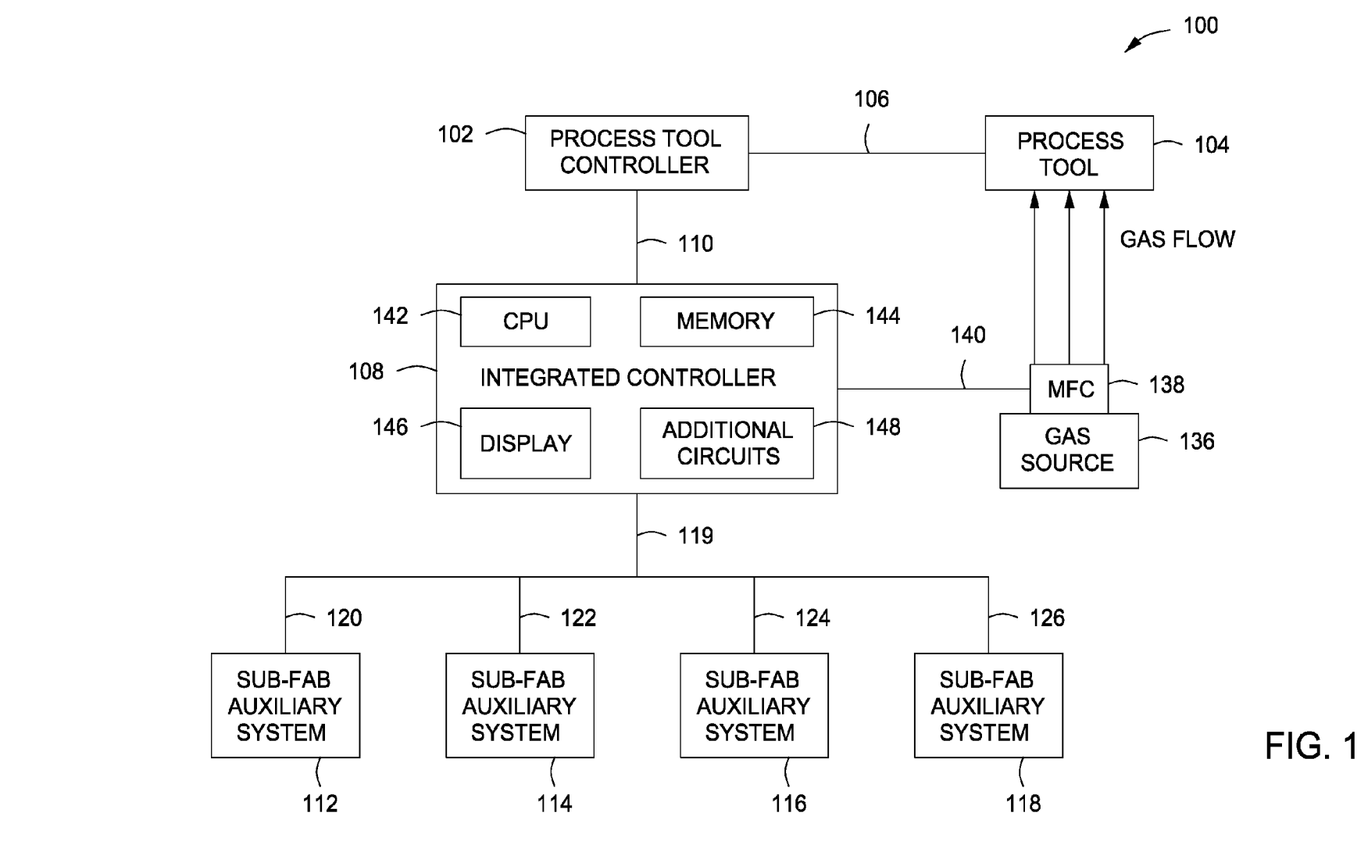
FIG. 1 depicts a schematic view of a processing system having a control system in accordance with some embodiments of the present invention.

FIG. 1 is a schematic depiction of a processing system 100 of an embodiment consistent with the present invention. Processing system 100 may include a process tool controller 102 which may be linked to a process tool 104 through communication link 106. Process tool controller 102 may be any microcomputer, microprocessor, logic circuit, a combination of hardware and software, or the like, suitable to control the operation of the process tool 104. For example, process tool controller 102 may be a PC, server tower, single board computer, and/or a compact PCI, etc. Process tool 104 may be any electronic device manufacturing process tool which requires effluent abatement and/or other resources from a sub-fab support system. Communication link 106 (and any other communication link described herein) may be hardwired or wireless and may use any suitable communication protocol.

The process tool controller 102 may be linked to the integrated controller 108 by means of communication link 110. The integrated controller 108 may comprise a central processing unit (CPU) 142, a memory 144, a display 146, and support circuits 148 for the CPU. The controller 108 may control each component of the processing system 100 directly, or via computers (or controllers) associated with particular process chamber and/or support system components. The controller 108 may be one of any form of general-purpose computer processor that can be used in an industrial setting for controlling various chambers and sub-processors. The memory, or computer-readable medium of the CPU may be one or more of readily available memory such as random access memory (RAM), read only memory (ROM), floppy disk, hard disk, flash, or any other form of digital storage, local or remote. The support circuits are coupled to the CPU for supporting the processor in a conventional manner. These circuits include cache, power supplies, clock circuits, input/output circuitry and subsystems, and the like. Inventive methods as described herein may be stored in the memory of the controller 108 as software routine that may be executed or invoked to control the operation of the substrate processing system 100 in the manner described herein. For example, each method step may be stored as or in a module of the memory 144. The software routine may also be stored and/or executed by additional CPUs (not shown) that are remotely located from the hardware being controlled by the controller 108.

The integrated controller 108 may be linked to one or more mass flow controllers (MFC) 138 through communication links 140. The MFC may control a gas source 136 which provides gas to process tool 104. The MFC may provide operating information either directly to the integrated controller through communications link 140, or indirectly through the process tool controller 102.

The integrated controller 108 may in turn be linked to sub-fab auxiliary systems/devices 112, 114, 116 and 118 through communication links 120, 122, 124 and 126, respectively. The sub-fab auxiliary systems/devices may each have a local controller (not shown) which communicates with the integrated controller and controls the sub-fab auxiliary systems/devices. Alternatively, the integrated controller 108 may perform the functionality of a lower-level local controller for any or all of the sub-fab auxiliary systems/devices. Although four sub-fab auxiliary systems/devices are shown, it should be noted that more or fewer than four sub-fab auxiliary systems/devices may be linked to the integrated controller 108. Sub-fab auxiliary systems/devices may include abatement tools, AC power distributors, primary vacuum pumps, spare vacuum pumps, water pumps, chillers, heat exchangers, process cooling water supplies and delivery systems, electrical power supplies and delivery systems, inert gas dumps, valves, device controllers, clean dry air supplies and delivery systems, ambient air supplies and delivery systems, inert gas supplies and delivery systems, fuel supplies and delivery systems, touch screens, process logic controllers, reagent supplies and delivery systems, etc.

In operation, process tool controller 102 may control the process tool 104 by operating one or more of robots, doors, pumps, valves, plasma generators, power supplies, etc. As described above, process tool controller 102 may be constantly aware regarding the state of, and resource requirements of, each chamber in the process tool 104 and of the process tool 104 as a whole. Process tool controller 102 may have access to a database (not shown) which the process tool controller 102 may use to calculate the resource requirements of the chambers (not shown) and the process tool 104 as a whole. Process tool controller 102 may send integrated controller 108 operating information regarding the state of each chamber in the process tool 104 and of the process tool 104 as a whole.

The integrated controller 108 may be linked to instruments in the sub-fab (not shown), calculate the resource requirements of the sub-fab auxiliary systems, and provide information regarding the resource requirements of the sub-fab auxiliary systems to the process tool controller 102.

The process tool controller 102 and MFC 138 may communicate process state and operating information (which may include configuration information) to the integrated controller 108 which may in turn control one or more sub-fab auxiliary systems 112, 114, 116 and 118 by operating pumps, switches valves, power supplies, and/or other hardware through communication links 119, 120, 122, 124 and 126. In the alternative, integrated controller 108 may direct sub-fab auxiliary system local controllers (not shown) to perform these functions. The integrated controller may obtain state and operating information (which may include configuration information) from sub-fab auxiliary systems 112, 114, 116 and 118. Examples of process state and operating information may include, but are not limited to, electrical power use, fuel gas and purge gas compositions, temperatures of processing environments, status of data connections, and the like. The integrated controller 108 may use the operating information obtain to ensure proper and safe operation of the processing system.

In some embodiments consistent with the present invention, the integrated controller 108 is configured to receive input values corresponding to operating information of at least one of process tool 104, mass flow controller 138 or at least one sub-fab auxiliary system 112, 114, 116 and 118. The integrated controller 108 is further configured to determine whether an error condition is matched based on the received input values. The integrated controller may be further configured to control the at least one sub-fab auxiliary system 112, 114, 116 and 118 to operate at a fail-safe operating mode responsive to a determination that an error condition is matched.

In other embodiments consistent with the present invention a method of controlling a substrate processing system may include monitoring operating information of at least one of a process tool 104, a mass flow controller 138 or at least one sub-fab auxiliary system 112, 114, 116 and 118, determining whether an error condition is matched based on the monitored operating information, and controlling at least one sub-fab auxiliary system to operate at a fail-safe operating mode responsive to a determination that an error condition is matched. In some embodiments, this method may be performed by the integrated controller 108.

Figure 2:
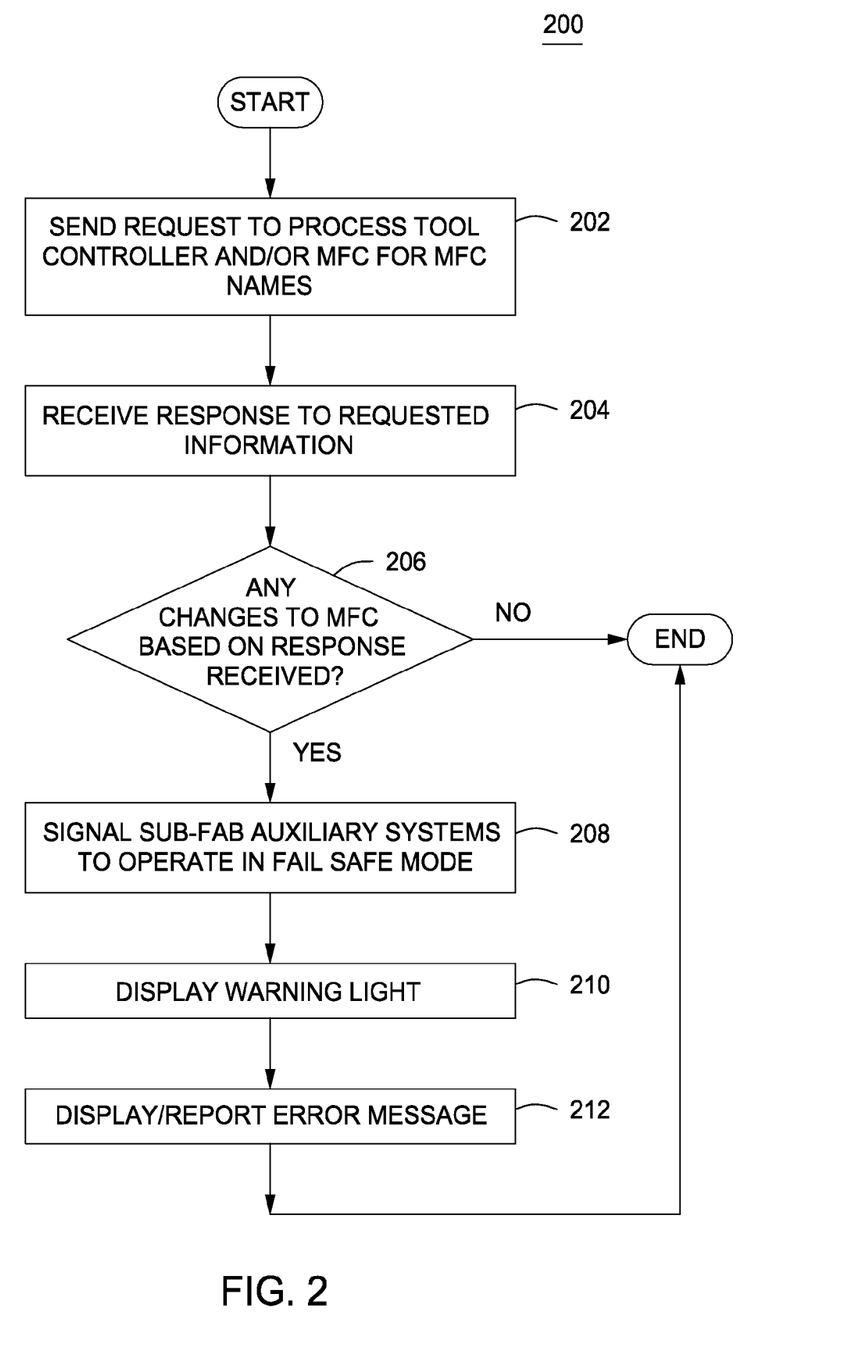
FIG. 2 depicts a flow chart of a method 200 for determining whether an error condition is matched in accordance with some embodiments of the present invention.

FIG. 2 depicts a flow chart of a method 200 for controlling a processing system in accordance with some embodiments of the present invention. In some embodiments, the method 200 may be an example of a module of the memory 144 of the integrated controller and may be used to control the processing system as described herein. The method 200 depicts a method which may be performed by integrated controller 108 which may poll the process tool controller 102 and/or MFC 138 for MFC names in order to determine any changes to MFC 138. MFC names, consistent with some embodiments described herein, may refer to gas names and additional MFCs. When the name is not correct or an additional MFC is detected, there is a risk that somebody has changed the system physically and the old set-up could result in unsafe operating conditions. If changes to MFC 138 are detected, an error condition is matched and integrated controller 108 may signal at least one of the sub-fab auxiliary systems 112, 114, 116 and 118 to operate at fail-safe operation mode until the new MFC information can be physically verified and the system is reset.

Generally the method 200 begins at 202 where integrated controller 108 may send a request for MFC names to at least one of process tool 104 or MFC 138. At 204 a response may be received responsive to the request sent. Integrated controller 108 may determine whether there are any changes to MFC 138 based on the response received at 206. If there are no changes, the method terminates. If integrated controller 108 determines that there are changes to MFC 138 (i.e., an error condition is matched), integrated controller 108 signals one or more of sub-fab auxiliary systems 112, 114, 116 and 118 to operate at fail-safe operation mode at 208. Additionally, integrated controller 108 may display a warning light and an error message at 210 and 212. Alternatively, integrated controller 108 may signal one or more of the process tool controller 104, MFC 138, or sub-fab auxiliary systems 112, 114, 116 and 118 to display a warning light and an error message.

Figure 3:
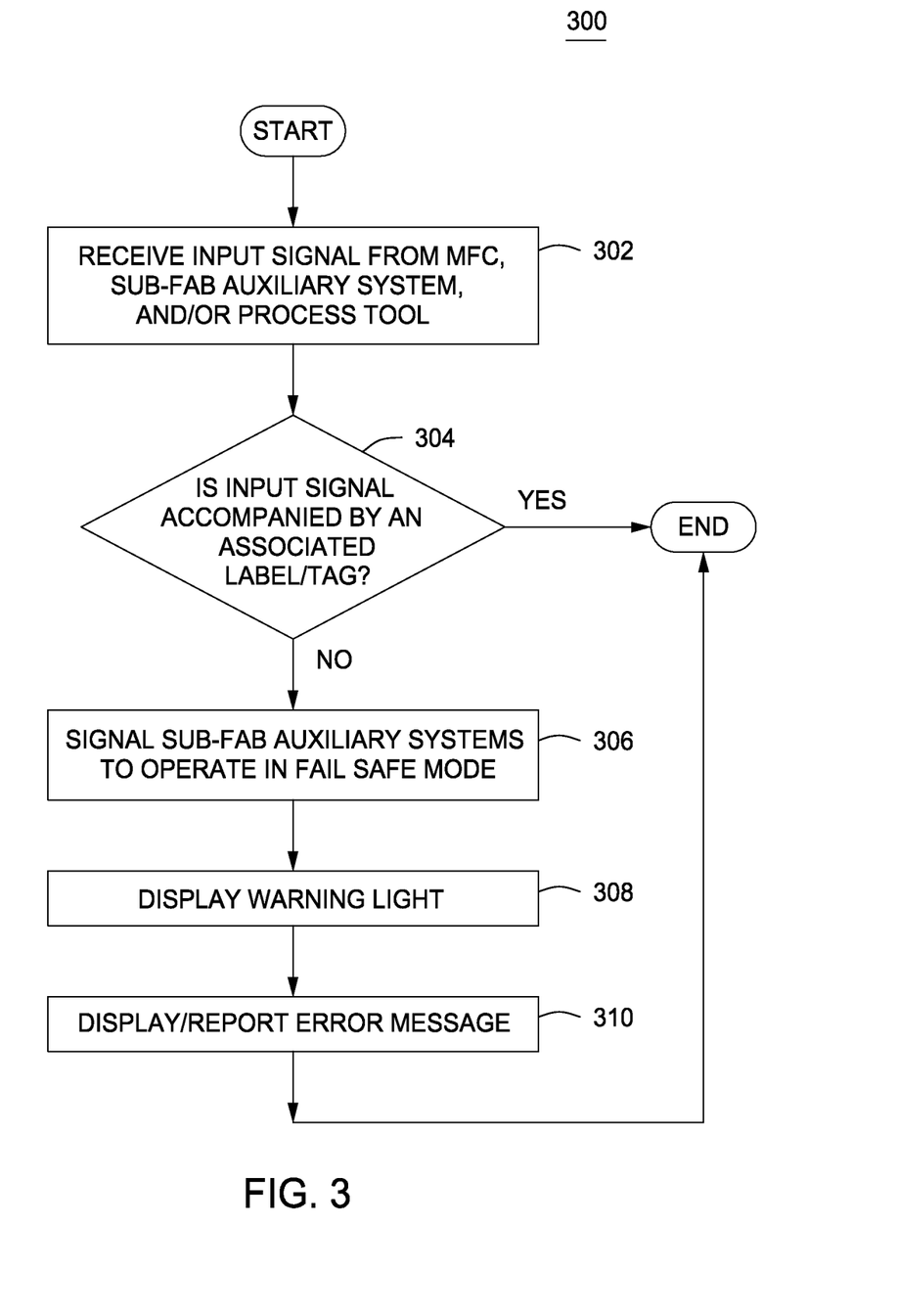
FIG. 3 depicts a flow chart of a second method 300 for determining whether an error condition is matched in accordance with some embodiments of the present invention.

FIG. 3 depicts a flow chart of a method 300 for controlling a processing system in accordance with some embodiments of the present invention. In some embodiments, the method 300 may be an example of a module of the memory 144 of the integrated controller and may be used to control the processing system as described herein. The method 300 depicts a method which may be performed by integrated controller 108.

Generally the method 300 begins at 302 where integrated controller 108 may receive an input signal from process tools, MFCs, or sub-fab auxiliary systems. Integrated controller 108 may determine if the received input signal is accompanied by a label at 304. For example, in some embodiments, the input signals may include specific information sent by process tool 104 or process tool controller 102 to integrated controller 108 such as status variable ID (SVID) information and collected event ID (CEID) information. SVID and CEID information may include, for example, gas names and flows, chamber status, recipe and lot start/stop information, and the like. If the received input signal is accompanied by a label identifying the source of the information, the method terminates. If integrated controller 108 determines the received input signal is not accompanied by a label (i.e., an error condition is matched), integrated controller 108 signals one or more of sub-fab auxiliary systems 112, 114, 116 and 118 to operate at fail-safe operation mode at 306. Additionally, integrated controller 108 may display a warning light and an error message at 308 and 310. Alternatively, integrated controller 108 may signal one or more of the process tool controller 102, MFC 138, or sub-fab auxiliary systems 112, 114, 116 and 118 to display a warning light and an error message.

Figure 4:
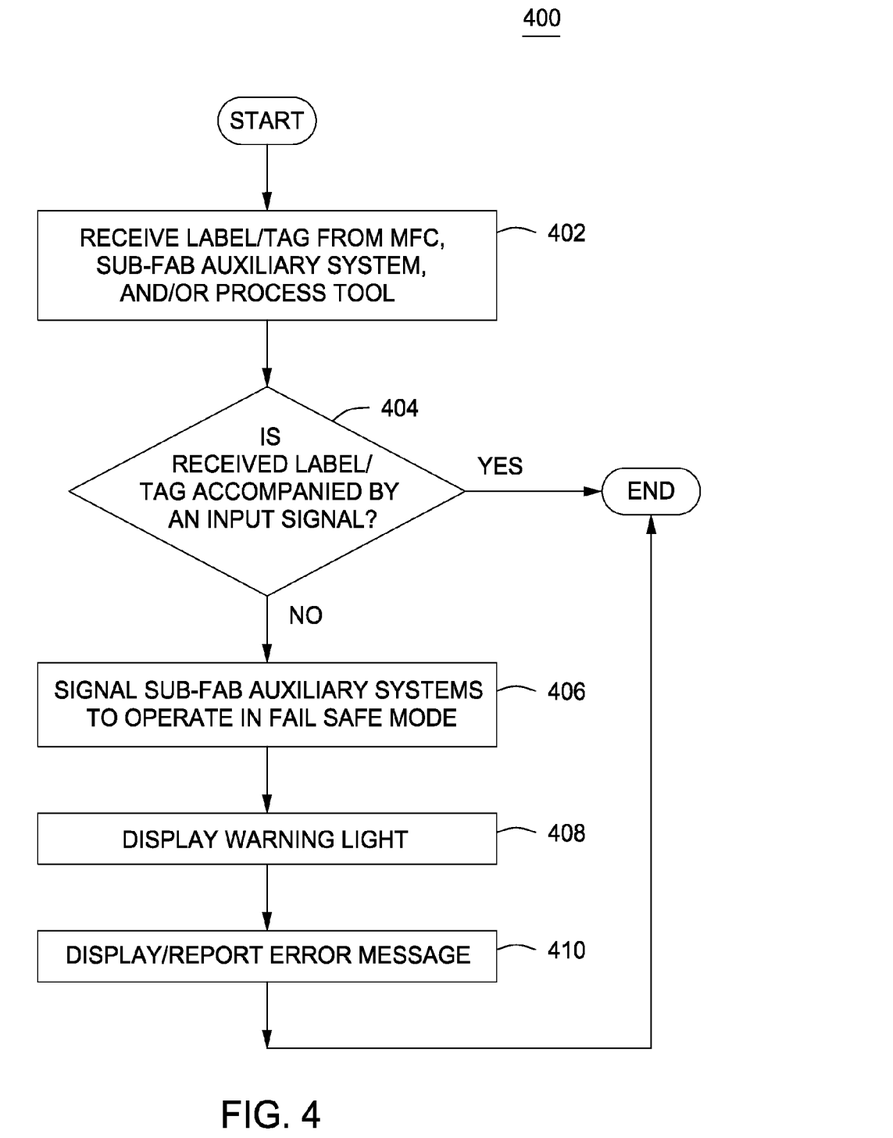
FIG. 4 depicts a flow chart of a third method 400 for determining whether an error condition is matched in accordance with some embodiments of the present invention.

FIG. 4 depicts a flow chart of a method 400 for controlling a processing system in accordance with some embodiments of the present invention. In some embodiments, the method 400 may be an example of a module of the memory 144 of the integrated controller and may be used to control the processing system as described herein. The method 400 depicts a method which may be performed by integrated controller 108.

Generally the method 400 begins at 402 where integrated controller 108 may receive a label from process tools, MFCs, or other sub-fab auxiliary systems. Integrated controller 108 may determine if the received label is accompanied by an associated input signal at 404. A label may identify the source of the information (e.g., process tool, MFC, sub-fab auxiliary system). The input signals may include specific information sent by process tool 104 or process tool controller 102 to integrated controller 108 such as status variable ID (SVID) information and collected event ID (CEID) information. SVID and CEID information may include, for example, gas names and flows, chamber status, recipe and lot start/stop information, etc. If the received label is accompanied by an associated input signal, the method terminates. If integrated controller 108 determines the received label is not accompanied by an input signal (i.e., an error condition is matched), integrated controller 108 signals one or more of sub-fab auxiliary systems 112, 114, 116 and 118 to operate at fail-safe operation mode at 406.

Additionally, integrated controller 108 may display a warning light and an error message at 408 and 410. Alternatively, integrated controller 108 may signal one or more of the process tool controller 102, MFC 138, or sub-fab auxiliary systems 112, 114, 116 and 118 to display a warning light and an error message.

Figure 5:
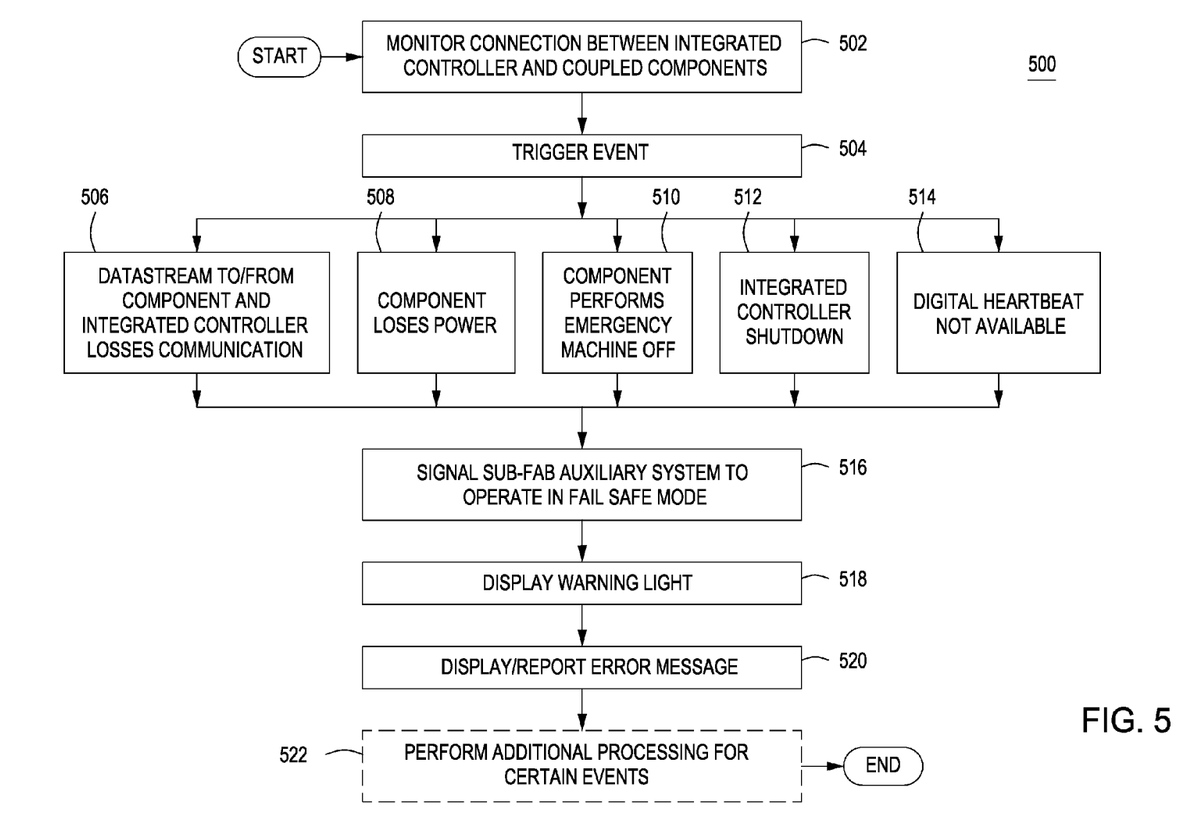
FIG. 5 depicts a flow chart of a fourth method 500 for determining whether an error condition is matched in accordance with some embodiments of the present invention.

FIG. 5 depicts a flow chart of a method 500 for controlling a processing system in accordance with some embodiments of the present invention. In some embodiments, the method 500 may be an example of a module of the memory 144 of the integrated controller and may be used to control the processing system as described herein. The method 500 depicts a method which may be performed by integrated controller 108.

Generally method 500 begins at 502 where integrated controller 108 may monitor the communication connection between integrated controller 108 and process tool 102, MFC 138, and sub-fab auxiliary systems 112, 114, 116 and 118. At 504, integrated controller 108 may determine if any one or more of a number of error conditions are matched. Specifically, error conditions may include:

a) integrated controller 108 determines that communication of any of the data streams is lost between integrated controller 108 and process tool 104, MFC 138, and sub-fab auxiliary systems 112, 114, 116 and 118 at 506;

b) integrated controller 108 determines that process tool 104, MFC 138, or sub-fab auxiliary systems 112, 114, 116 and 118 loses power at 508;

c) integrated controller 108 determines that process tool 104, MFC 138, or sub-fab auxiliary systems 112, 114, 116 and 118 performs an emergency machine off ("EMO") procedure at 510;

d) a shutdown procedure is initiated by integrated controller 108 at 512; or e) integrated controller 108 determines that a monitored digital heartbeat is not available at 514. A digital heartbeat may include an electrical signal sent at discreet intervals by a fab or sub-fab system which indicates that the fab or sub-fab system is powered and functioning. In some embodiments, the signal may be generated and sent by integrated controller 108 with an ACK signal returned by the fab or sub-fab system.

If any of the aforementioned error conditions occur, integrated controller 108 signals one or more of sub-fab auxiliary systems 112, 114, 116 and 118 to operate at fail-safe operation mode at 516. Additionally, integrated controller 108 may display a warning light and an error message at 518 and 520. Alternatively or in combination, integrated controller 108 may signal one or more of the process tool controller 102, MFC 138, or sub-fab auxiliary systems 112, 114, 116 and 118 to display a warning light and an error message.

In embodiments consistent with FIG. 5, if integrated controller 108 determines that process tool 104, MFC 138, or sub-fab auxiliary systems 112, 114, 116 and 118 loses power or performs an EMO procedure, additional processing may be performed in 522. Specifically, when a process is running and is abruptly shut down, gas may be trapped in the process tool gas chamber, pumps, and lines. When the process is restarted, abatement systems might not know gas was flowing and still remains in the system, and would remain in idle mode. However, embodiments consistent with the present invention may retain the knowledge that gas was flowing prior to the last process interrupt and the abatement would start up in low fuel mode for a set period of time instead of starting up in pump run mode. This would assure that the gas from the process tool chamber, pump, and gas lines was abated. Knowledge that gas was flowing prior to the last process interrupt may be retained via an indicator stored in memory 144.

Figure 6:
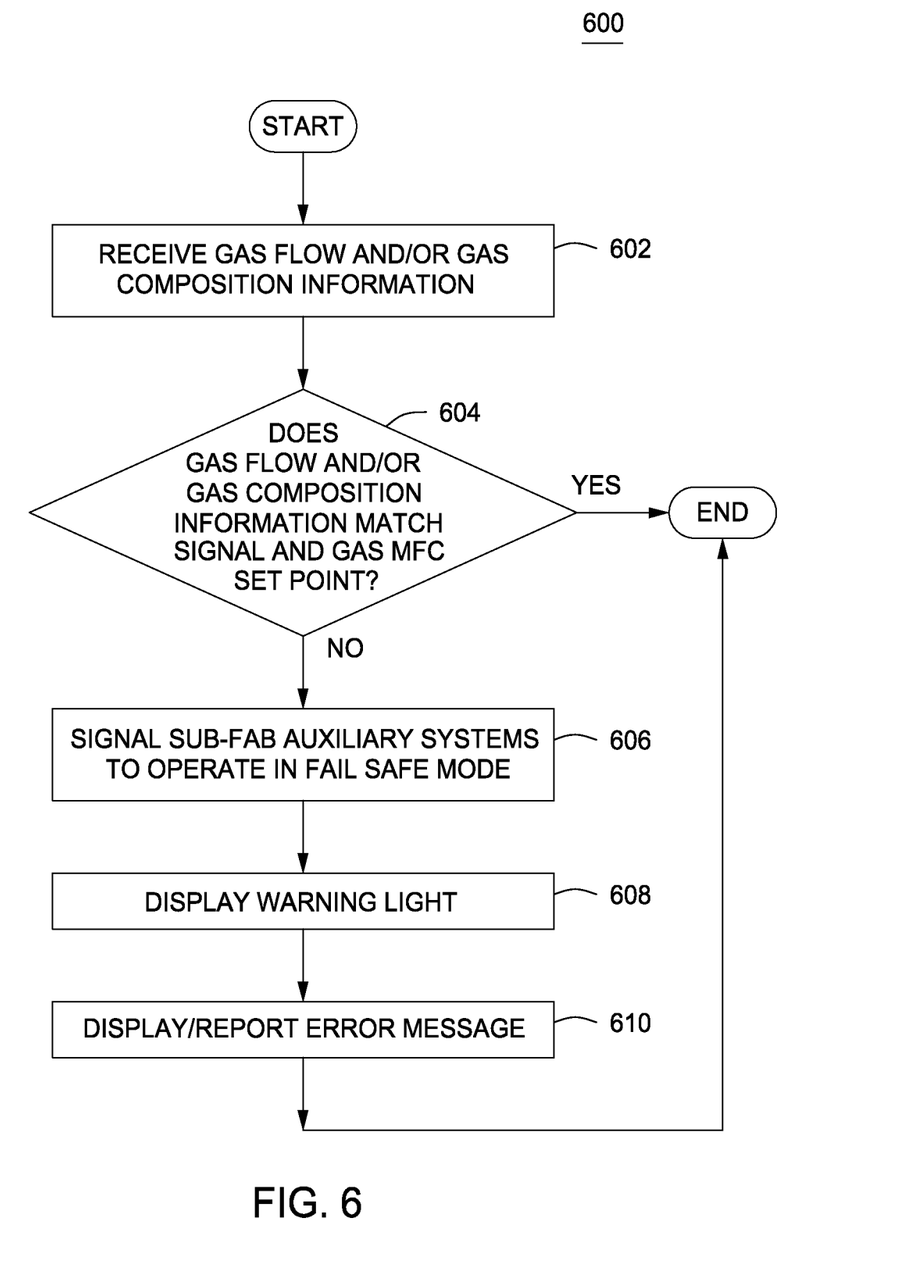
FIG. 6 depicts a flow chart of other methods 600 for determining whether an error condition is matched in accordance with some embodiments of the present invention.

FIG. 6 depicts a flow chart of a method 600 for controlling a processing system in accordance with some embodiments of the present invention. In some embodiments, the method 600 may be an example of a module of the memory 144 of the integrated controller and may be used to control the processing system as described herein. The method 600 depicts a method which may be performed by integrated controller 108.

Generally method 600 begins at 602 where integrated controller 108 may receive gas flow and/or gas composition information from at least one of the process tool controller 102 or MFC 138. Integrated controller 108 may determine if the received gas flow and/or gas composition information matches previously stored gas flow and/or gas composition information at 604. The gas flow and/or gas composition information may be stored in data structures in integrated controller memory 144 or in sub-fab auxiliary system memory (now shown). If the received gas flow and/or gas composition information matches stored gas flow and/or gas composition information, the method terminates. If integrated controller 108 determines that the received gas flow and/or gas composition information does not match stored gas flow and/or gas composition information (i.e., an error condition is matched), integrated controller 108 signals one or more of sub-fab auxiliary systems 112, 114, 116 and 118 to operate at fail-safe operation mode at 606. Additionally, integrated controller 108 may display a warning light and an error message at 608 and 610. Alternatively, integrated controller 108 may signal one or more of the process tool controller 102, MFC 138, or sub-fab auxiliary systems 112, 114, 116 and 118 to display a warning light and an error message.

In each of the embodiments described above, in addition to warning lights and error messages, integrated controller 108 can produce standard reports including statistical analysis, details of the error conditions matched, change in process capability based on the error conditions matched, and/or confidence level of failure or risk of not performing the recommended preventative maintenance activities (i.e., not operating in fail-safe mode).

While the foregoing is directed to embodiments of the present invention, other and further embodiments of the invention may be devised without departing from the basic scope thereof.

The invention claimed is:

1. A manufacturing system, comprising:
an integrated controller having one or more inputs to receive input values corresponding to operating information of at least one of a process tool, a mass flow controller or at least one sub-fab auxiliary system, wherein the integrated controller is configured to:
(a) receive the input values, wherein the input value includes information regarding at least one of gas names, gas flows, chamber status, process recipe, or lot start/stop information,
(b) determine that an error condition is matched based on the received input values when the input value is received without an associated label of the process tool, the mass flow controller or the at least one sub-fab auxiliary system, wherein the label identifies a source of the input value, and (c) control an abatement system to operate at a high energy operating mode responsive to the determined error condition.

2. The manufacturing system of claim 1, wherein the integrated controller is communicatively coupled to:
a process tool controller linked to the process tool, wherein the process tool controller is adapted to control the process tool;
the mass flow controller, wherein the mass flow controller is linked to a gas source, the gas source being coupled to the process tool to provide one or more gasses to the process tool, wherein the one or more gasses provided to the process tool by the gas source are controlled by the mass flow controller;
the at least one sub-fab auxiliary system; and
the abatement system.

3. A method of controlling a manufacturing system, comprising:
monitoring, by an integrated controller, operating information of at least one of a process tool, a mass flow controller (MFC) or at least one sub-fab auxiliary system of the manufacturing system;
determining, by the integrated controller, that an error condition is matched based on the monitored operating information, wherein determining that an error condition is matched based on the monitored operating information includes:
sending a request to at least one of the process tool controller, or the MFC, for MFC names wherein the MFC names refer to gas names and/or additional MFCs;
receiving a response to the request;
determining that the MFC name is not correct or an additional MFC is detected based on the received response; and
determining that the error condition is matched; and
controlling, by the integrated controller, the at least one sub-fab auxiliary system to operate at a fail-safe operating mode responsive to the determined error condition.

4. The method of claim 3, wherein at least one of the at least one sub-fab auxiliary system is an abatement system.

5. The method of claim 4, wherein the abatement system has a local abatement controller which controls the abatement system, and wherein controlling the at least one sub-fab auxiliary system to operate at the fail-safe operating mode includes signaling the local abatement controller to operate at the fail-safe operating mode.

6. The method of claim 4, wherein the fail-safe operating mode of the abatement system includes operating the abatement system in a high energy mode which can accommodate a maximum process demand of the process tool on the abatement system.

7. The method of claim 3, wherein at least one of the at least one sub-fab auxiliary system is a pump.

8. The method of claim 7, wherein the pump has a local pump controller which controls the pump, and wherein controlling the at least one of the at least one sub-fab auxiliary system to operate at a fail-safe operating mode includes signalling the local pump controller to operate at a fail-safe operating mode.

9. The method of claim 7, wherein the fail-safe operating mode of the pump includes operating the pump in a high speed mode which can accommodate a maximum process demand of the process tool on the pump.

10. A method of controlling a manufacturing system, comprising:
monitoring, by an integrated controller, operating information of at least one of a process tool, a mass flow controller (MFC) or at least one sub-fab auxiliary system of the manufacturing system;
determining, by the integrated controller, that an error condition is matched based on the monitored operating information, wherein determining that an error condition is matched based on the monitored operating information includes:
receiving an input signal from at least one of the process tool controller, the mass flow controller or the at least one sub-fab auxiliary system, wherein the input signal includes information regarding at least one of gas names, gas flows, chamber status, process recipe, or lot start/stop information;
determining that the received input signal is not accompanied by an associated label of the process tool, the mass flow controller or the at least one sub-fab auxiliary system that sent the input signal, wherein the label identifies a source of the input signal; and
determining that the error condition is matched; and
controlling, by the integrated controller, the at least one sub-fab auxiliary system to operate at a fail-safe operating mode responsive to the determined error condition.

11. A method of controlling a manufacturing system, comprising:
monitoring, by an integrated controller, operating information of at least one of a process tool, a mass flow controller (MFC) or at least one sub-fab auxiliary system of the manufacturing system;
determining, by the integrated controller, that an error condition is matched based on the monitored operating information, wherein determining that an error condition is matched based on the monitored operating information includes:
receiving a label of the process tool controller, the mass flow controller or the at least one sub-fab auxiliary system;
determining that the received label is not accompanied by an associated input signal of the process tool controller, the mass flow controller or the at least one sub-fab auxiliary system that sent the label, wherein the input signal includes information regarding at least one of gas names, gas flows, chamber status, process recipe, or lot start/stop information, and wherein the label identifies a source of the input signal; and
determining that the error condition is matched; and
controlling, by the integrated controller, the at least one sub-fab auxiliary system to operate at a fail-safe operating mode responsive to the determined error condition.

12. A method of controlling a manufacturing system, comprising:
monitoring, by an integrated controller, operating information of at least one of a process tool, a mass flow controller (MFC) or at least one sub-fab auxiliary system, wherein at least one of the at least one sub-fab auxiliary system is an abatement system;
determining that the process tool, the mass flow controller at least one sub-fab auxiliary system loses power;
determining that gas was flowing in the manufacturing system prior to the process tool, the mass flow controller or the at least one sub-fab auxiliary system losing power;

storing an indicator that gas was flowing in the manufacturing system; and operating the abatement system in low-fuel mode prior to restarting in manufacturing system in a normal processing run mode to abate any residual gas that was flowing in the manufacturing system prior to the process tool, the mass flow controller or the at least one sub-fab auxiliary system losing power.

\* \* \* \* \*